US012637058B2

US 12,637,058 B2

(12) United States Patent
Chen et al.

(10) Patent No.: US 12,637,058 B2
(45) Date of Patent: May 26, 2026

(54) POWER CONSERVATION CONTROL METHOD AND APPARATUS FOR VEHICLE, AND READABLE STORAGE MEDIUM

(71) Applicant: BYD COMPANY LIMITED, Shenzhen (CN)

(72) Inventors: Zhile Chen, Shenzhen (CN); Jiquan Wang, Shenzhen (CN); Boliang Xu, Shenzhen (CN); Chunsheng Wang, Shenzhen (CN); Lei Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 487 days.

(21) Appl. No.: 18/175,217

(22) Filed: Feb. 27, 2023

(65) Prior Publication Data

US 2023/0202454 A1     Jun. 29, 2023

Related U.S. Application Data

(63) Continuation of application No. PCT/CN2021/114536, filed on Aug. 25, 2021.

(30) Foreign Application Priority Data

Aug. 27, 2020     (CN) .......................... 202010876473.3

(51) Int. Cl.
*B60W 20/13*          (2016.01)
*B60W 10/06*          (2006.01)
(Continued)

(52) U.S. Cl.
CPC ............ B60W 20/13 (2016.01); B60W 10/06 (2013.01); B60W 10/08 (2013.01); B60W 50/06 (2013.01);
(Continued)

(58) Field of Classification Search
CPC ................ B60W 20/13; B60W 10/08; B60W 2510/244; B60W 50/06; B60L 58/14; B60L 58/24; B60L 2240/662; B60L 2260/56
(Continued)

(56) References Cited

U.S. PATENT DOCUMENTS

2010/0066302 A1     3/2010   Gregg et al.
2012/0200257 A1     8/2012   Schwarz et al.
(Continued)

FOREIGN PATENT DOCUMENTS

CN          101449448 A      6/2009
CN          105050865 A      11/2015
(Continued)

OTHER PUBLICATIONS

English translation of International Search Report from PCT/CN2021/114536 dated Nov. 1, 2021 (2 pages).

*Primary Examiner* — Hitesh Patel
*Assistant Examiner* — John D Holman
(74) *Attorney, Agent, or Firm* — Calfee, Halter & Griswold LLP

(57)          ABSTRACT

A power conservation control method and apparatus for a vehicle, and a readable storage medium. The method includes: obtaining a minimum predicted ambient temperature within a preset time period; determining a minimum ambient temperature according to the minimum predicted ambient temperature and a current ambient temperature; if the minimum ambient temperature is less than or equal to a first preset temperature threshold, determining a minimum power conservation point of a traction battery according to the minimum ambient temperature; and performing mandatory power conservation control on the vehicle according to the minimum power conservation point, so that the remain-
(Continued)

ing power of the traction battery is not less than the minimum power conservation point.

17 Claims, 10 Drawing Sheets

(51) Int. Cl.
   *B60W 10/08*        (2006.01)
   *B60W 50/06*        (2006.01)
(52) U.S. Cl.
   CPC ... *B60W 2510/244* (2013.01); *B60W 2555/20* (2020.02)
(58) Field of Classification Search
   USPC .......................................................... 701/22
   See application file for complete search history.

(56)                References Cited

U.S. PATENT DOCUMENTS

| | | | |
|---|---|---|---|
| 2015/0360578 | A1 | 12/2015 | Duan |
| 2016/0303992 | A1 | 10/2016 | Lovett et al. |
| 2017/0144666 | A1* | 5/2017 | Yonan ................. B60W 30/182 |
| 2019/0217720 | A1* | 7/2019 | Treharne ................. B60L 58/22 |
| 2019/0285041 | A1 | 9/2019 | Chen |
| 2020/0331452 | A1* | 10/2020 | Ferreira De Araujo ..................... B60W 20/11 |
| 2022/0336873 | A1* | 10/2022 | Zhao ..................... H02J 7/0063 |

FOREIGN PATENT DOCUMENTS

| | | |
|---|---|---|
| CN | 105539423 A | 5/2016 |
| CN | 106143482 A | 11/2016 |
| CN | 106740825 A | 5/2017 |
| CN | 104787036 B | 9/2018 |
| CN | 110281858 A | 9/2019 |
| CN | 111032465 A | 4/2020 |
| CN | 111332297 A | 6/2020 |
| CN | 112519633 A | 3/2021 |
| CN | 113002364 A | 6/2021 |
| WO | 2014033915 A1 | 3/2014 |
| WO | 2019042818 A1 | 3/2019 |

* cited by examiner

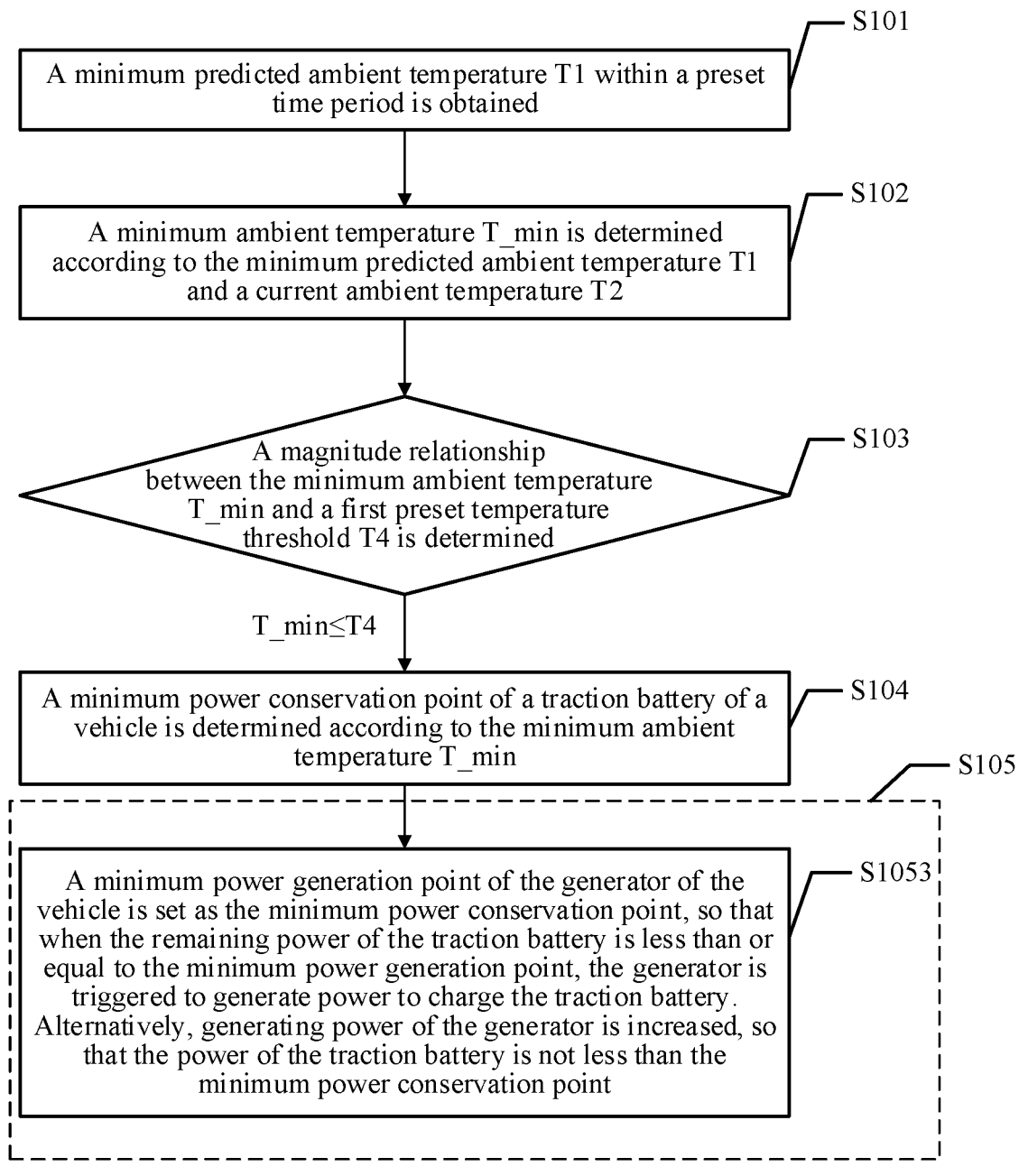

S101

A minimum predicted ambient temperature T1 within a preset time period is obtained

S102

A minimum ambient temperature T_min is determined according to the minimum predicted ambient temperature T1 and a current ambient temperature T2

S103

A magnitude relationship between the minimum ambient temperature T_min and a first preset temperature threshold T4 is determined $T\_min \leq T4$

S104

A minimum power conservation point of a traction battery of a vehicle is determined according to the minimum ambient temperature T_min

S105

S1053

A minimum power generation point of the generator of the vehicle is set as the minimum power conservation point, so that when the remaining power of the traction battery is less than or equal to the minimum power generation point, the generator is triggered to generate power to charge the traction battery. Alternatively, generating power of the generator is increased, so that the power of the traction battery is not less than the minimum power conservation point

FIG. 8

POWER CONSERVATION CONTROL METHOD AND APPARATUS FOR VEHICLE, AND READABLE STORAGE MEDIUM

CROSS-REFERENCE TO RELATED APPLICATIONS

The present disclosure is a bypass continuation application of PCT International Application No. PCT/CN2021/114536, filed on Aug. 25, 2021, which claims priority to and benefits of Chinese Patent Application No. 202010876473.3, filed on Aug. 27, 2020. The entire contents of the above-referenced applications are incorporated herein by reference.

FIELD

The present disclosure relates to the technical field of engine startup optimization for vehicles, and more specifically, to a power conservation control method and apparatus for a vehicle, and a readable storage medium.

BACKGROUND

In starting an engine of a vehicle, there are usually the following cases: In a first case, the vehicle is equipped with a starter, which converts electric energy of a low voltage battery into mechanical energy through the discharge of the low voltage battery, to drive the engine to rotate to achieve engine starting. This is a common method for conventional fuel vehicles and other hybrid electric vehicles. In a second case, the vehicle is configured with a P0 or P1 drive structure. The engine is started by discharging of a traction battery. In a third case, the vehicle is configured with a P2, P3, or P4 drive structure. Discharging of a traction battery causes the P2, P3, or P4 drive structure to drive the whole vehicle to move. After the vehicle speeds up, in combination with a clutch, the engine is driven to start by inertia.

In the related art, in starting an engine of a vehicle, discharge power is extremely low when an ambient temperature is low and an SOC is low, and consequently, the engine cannot be directly started, which reduces the probability of successfully starting the engine, resulting in a relatively high risk of breaking down of the vehicle.

SUMMARY

Embodiments of the present disclosure provide a power conservation control method and apparatus for a vehicle, and a readable storage medium.

According to a first aspect, a power conservation control method for a vehicle is provided, which includes:

A minimum predicted ambient temperature within a preset time period is obtained.

A minimum ambient temperature is determined according to the minimum predicted ambient temperature and a current ambient temperature.

If the minimum ambient temperature is less than or equal to a first preset temperature threshold, a minimum power conservation point of a traction battery of the vehicle is determined according to the minimum ambient temperature.

Mandatory power conservation control is performed on the vehicle according to the minimum power conservation point, so that the remaining power of the traction battery is not less than the minimum power conservation point.

Further, before the performing mandatory power conservation control on the vehicle according to the minimum power conservation point, the method includes:

The remaining power of the traction battery is detected in real time.

If the remaining power of the traction battery drops to a preset power, a user is reminded in a preset interaction method to enable a mandatory power conservation function.

If a confirmation instruction on choosing to enable the mandatory power conservation function is received from the user, mandatory power conservation control is performed on the vehicle according to the minimum power conservation point.

Further, the performing mandatory power conservation control on the vehicle according to the minimum power conservation point includes:

Torque distribution of an engine and a drive motor of the vehicle is controlled according to a difference between the minimum power conservation point and the remaining power of the traction battery. A smaller difference between the minimum power conservation point and the remaining power of the traction battery indicates a smaller torque distribution percentage of the drive motor.

Further, the performing mandatory power conservation control on the vehicle according to the minimum power conservation point includes:

When a generator of the vehicle performs torque compensation on the engine of the vehicle, the torque compensation by the generator is controlled according to the difference between the minimum power conservation point and the remaining power of the traction battery and a difference between an engine distribution target torque and an engine economic torque. A smaller difference between the minimum power conservation point and the remaining power of the traction battery indicates a smaller percentage of the torque compensation by the generator in the difference between the engine distribution target torque and the engine economic torque.

Further, the performing mandatory power conservation control on the vehicle according to the minimum power conservation point includes:

A minimum power generation point of the generator of the vehicle is set as the minimum power conservation point, so that when the remaining power of the traction battery is less than or equal to the minimum power generation point, the generator is triggered to generate power to charge the traction battery.

Alternatively, generating power of the generator is increased, so that the remaining power of the traction battery is not less than the minimum power conservation point.

Further, the performing mandatory power conservation control on the vehicle according to the minimum power conservation point includes:

A magnitude relationship between the remaining power of the traction battery and the minimum power conservation point is determined.

If the remaining power of the traction battery is less than the minimum power conservation point, output power of the engine of the vehicle is limited, and the engine is controlled to drive the generator of the vehicle to generate power to charge the traction battery.

Further, after the determining a minimum power conservation point of a traction battery according to the minimum ambient temperature, the method further includes:

A minimum power starting point corresponding to the engine of the vehicle is set as the minimum power conservation point. When the remaining power of the traction battery is less than the minimum power starting point, the engine is in a constant start state.

A start power threshold and a stopping power threshold of the engine are controlled according to the difference between the minimum power conservation point and the remaining power of the traction battery. A smaller difference between the minimum power conservation point and the remaining power of the traction battery indicates a smaller start power threshold and a smaller stopping power threshold of the engine.

Further, the determining a minimum ambient temperature according to the predicted ambient temperature and a current ambient temperature includes:

A magnitude relationship between the predicted ambient temperature and the current ambient temperature is determined.

If the predicted ambient temperature is less than the current ambient temperature, the predicted ambient temperature is determined as the minimum ambient temperature.

Alternatively, if the predicted ambient temperature is greater than or equal to the current ambient temperature, the current ambient temperature is determined as the minimum ambient temperature.

Further, the method further includes:

If the minimum ambient temperature is greater than the first preset temperature threshold, a magnitude relationship between the minimum ambient temperature and a second preset temperature threshold is determined.

If the minimum ambient temperature is greater than or equal to the second preset temperature threshold, the vehicle is controlled to exit the mandatory power conservation control.

Alternatively, if the minimum ambient temperature is less than the second preset temperature threshold, a previous mandatory power conservation control state is maintained.

Further, after it is determined whether a minimum predicted ambient temperature within a future preset time period is obtained, the method further includes:

If no minimum predicted ambient temperature within the future preset time period is obtained, a difference between the current ambient temperature and a preset calibration temperature value is determined. The preset calibration temperature value is a calibration temperature value corresponding to the current ambient temperature.

The difference between the current ambient temperature and the preset calibration temperature value is used as the minimum ambient temperature.

According to a second aspect, a power conservation control apparatus for a vehicle is provided, which includes:

an obtaining module, configured to obtain a minimum predicted ambient temperature within a preset time period;

a first determining module, configured to determine a minimum ambient temperature according to the minimum predicted ambient temperature and a current ambient temperature if the minimum predicted ambient temperature is obtained;

a second determining module, configured to determine a minimum power conservation point of a traction battery of the vehicle according to the minimum ambient temperature if the minimum ambient temperature is less than or equal to a first preset temperature threshold; and a control module, configured to perform mandatory power conservation control on the vehicle according to the minimum power conservation point, so that the remaining power of the traction battery is not less than the minimum power conservation point.

According to a third aspect, a power conservation control apparatus for a vehicle is provided, which includes a memory, a processor, and a computer program stored in the memory and executable on the processor. When the processor executes the computer program, the power conservation control method for a vehicle described above is implemented.

According to a fourth aspect, a readable storage medium is provided, which stores a computer program. The computer program, when executed by a processor, implements the power conservation control method for a vehicle described above.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and those of ordinary skill in the art may still derive other drawings from these accompanying drawings without creative efforts.

FIG. 8 is a flowchart of a third-aspect embodiment of step S105 according to an embodiment of the present disclosure;

DETAILED DESCRIPTION

The following clearly and completely describes the technical solutions in the embodiments of the present disclosure with reference to the accompanying drawings in the embodiments of the present disclosure. Apparently, the described embodiments are merely some of the embodiments of the present disclosure rather than all of the embodiments. All other embodiments obtained by those of ordinary skill in the art based on the embodiments of the present disclosure without creative efforts should fall within the protection scope of the present disclosure.

The present disclosure provides a power conservation control method for a vehicle. The vehicle may be a hybrid electric vehicle or a conventional fuel vehicle. Exemplarily, for example, the vehicle may be a dual mode electric vehicle (Dual Mode Electric Vehicle), which is not specifically limited in the present disclosure. The present disclosure provides a vehicle control method, to resolve the related-art problem of a low success rate of starting an engine and a consequently relatively high risk of breaking down of a vehicle caused by a case that an engine cannot be directly started or an engine cannot be driven more quickly to start. The following describes a vehicle control method provided in the present disclosure in detail.

Figure 1:
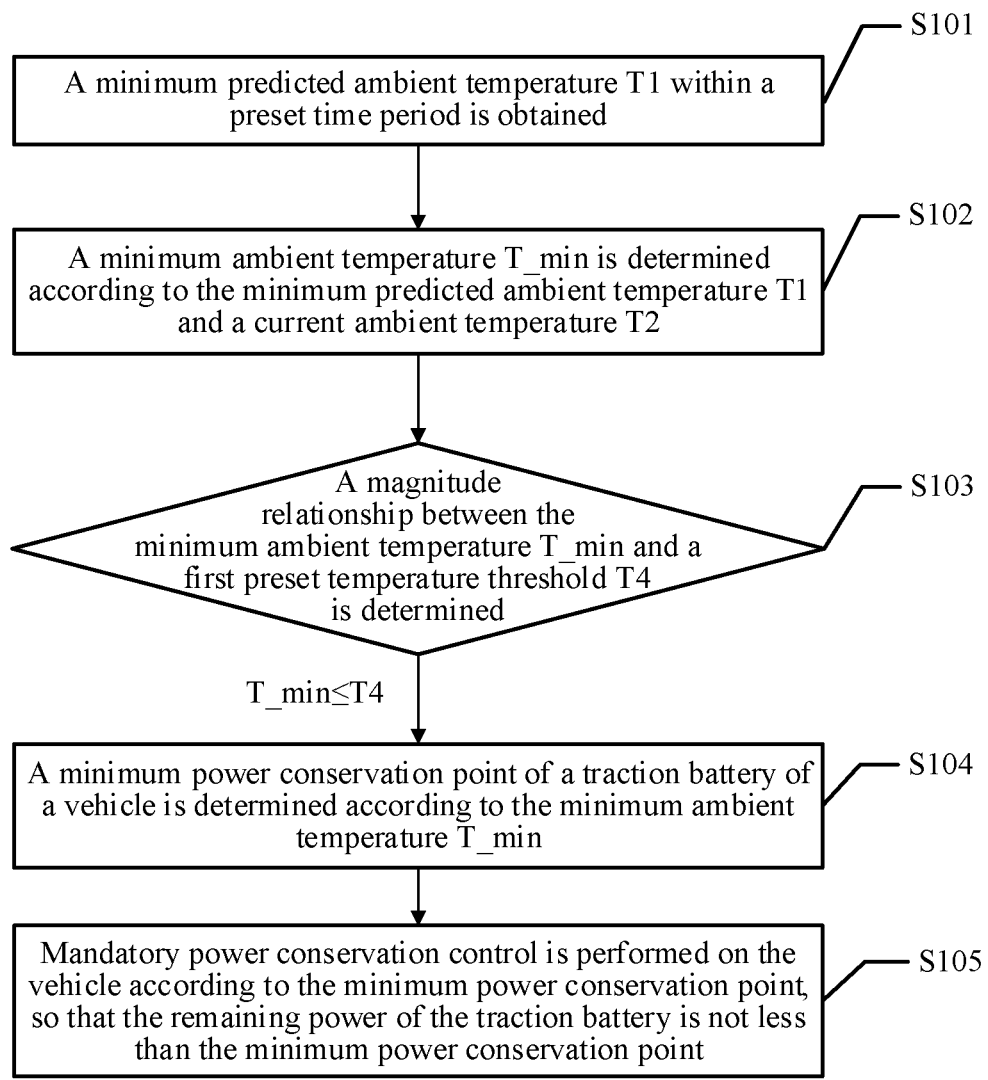
FIG. 1 is a schematic flowchart of a power conservation control method for a vehicle according to an embodiment of the present disclosure.

In some embodiments, as shown in FIG. 1, a power conservation control method for a vehicle is provided, which includes the following steps:

S101: A minimum predicted ambient temperature T1 within a preset time period is obtained.

The minimum predicted ambient temperature T1 refers to a minimum predicted ambient temperature obtained in a preset manner in an area to which the vehicle belongs within a future preset time period. Exemplarily, in an implementation, the preset time period refers to the next 24 hours. In this case, the minimum predicted ambient temperature T1 refers to a predicted minimum ambient temperature in the next 24 hours. In an implementation, the minimum predicted ambient temperature T1 within the future preset time period may be obtained from a weather forecast organization through the Internet.

It should be noted that, the area to which the vehicle belongs is an area in which the vehicle is located, such as a city or a region. For example, in an application scenario, when a user triggers a mandatory power conservation function, an area may be selected as an area in which the vehicle is to be located in the next 24 hours, so as to obtain a minimum predicted ambient temperature T1 in the area in the future preset time period. Alternatively, the area in which the vehicle is located is determined by positioning. By determining the area in which the vehicle is located within a future time period by positioning, a minimum predicted ambient temperature T1 in the area within the future preset time period is obtained, which provides conditions for subsequent execution logic.

It can be learned that, in this embodiment, it is determined in real time whether the minimum predicted ambient temperature T1 within the future preset time period is obtained. If the minimum predicted ambient temperature T1 within the future preset time period is obtained, step S102 is performed. In addition, it should be noted that, obtaining the minimum predicted ambient temperature T1 through the Internet can enhance the interaction between the vehicle and the Internet, which is more intelligent.

S102: A minimum ambient temperature T_min is determined according to the minimum predicted ambient temperature T1 and a current ambient temperature T2.

In this embodiment, the current ambient temperature T2 of the vehicle may be further obtained in real time. After the minimum predicted ambient temperature T1 and the current ambient temperature T2 are obtained, the minimum ambient temperature T_min is determined according to the minimum predicted ambient temperature T1 and the current ambient temperature T2. In some embodiments, a smaller one of the minimum predicted ambient temperature T1 and the current ambient temperature T2 may be directly selected as the minimum ambient temperature T_min.

It can be understood that, both the minimum predicted ambient temperature T1 and the current ambient temperature T2 may be variable values. In this embodiment of the present disclosure, the minimum predicted ambient temperature T1 and the current ambient temperature T2 may be obtained in real time, and the minimum ambient temperature T_min is determined in real time according to the minimum predicted ambient temperature T1 and the current ambient temperature T2.

S103: A magnitude relationship between the minimum ambient temperature T_min and a first preset temperature threshold T4 is determined, and if the minimum ambient temperature T_min is less than or equal to the first preset temperature threshold T4, step S104 is performed.

S104: A minimum power conservation point of a traction battery is determined according to the minimum ambient temperature T_min.

The first preset temperature threshold T4 is a pre-configured temperature threshold. Before the implementation of this step, a real-vehicle simulation test may be conducted with a real-time ambient temperature of a real vehicle, to determine a temperature threshold at which the real vehicle has a risk of breaking down when the real vehicle is at the real-time ambient temperature.

After the minimum ambient temperature T_min is determined according to the minimum predicted ambient temperature T1 and the current ambient temperature T2, the magnitude relationship between the minimum ambient temperature T_min and the first preset temperature threshold T4 is determined. If the minimum ambient temperature T_min is less than or equal to the first preset temperature threshold T4, it indicates that the traction battery of the vehicle is to face a low-temperature state that may lead to a risk of breaking down. In this case, the vehicle needs to be controlled to enter a mandatory power conservation state, to reduce or avoid a subsequent problem of insufficient remaining power of the traction battery, thereby ensuring that the traction battery has sufficient power to provide to the engine after the next power-on, to enable the engine to have sufficient drive power to start the engine, avoiding or reducing the risk of breaking down of the vehicle.

Specifically, if the minimum ambient temperature T_min is less than or equal to the first preset temperature threshold T4, the minimum power conservation point is determined according to the minimum ambient temperature T_min. In this embodiment, corresponding minimum power conservation points are configured for different minimum ambient temperatures T_min. The minimum power conservation point is the minimum remaining power at the current minimum ambient temperature T_min that enables the vehicle to have no risk of breaking down at the minimum ambient temperature T_min and that enables the engine to start normally.

S105: Mandatory power conservation control is performed on the vehicle according to the minimum power conservation point, so that the remaining power of the traction battery is not less than the minimum power conservation point.

It can be learned that, according to the power conservation control method for a vehicle provided in the embodiments of the present disclosure, after a minimum power conservation point is obtained, a minimum remaining power value that can enable the engine to start normally at a minimum ambient temperature T_min to be faced by the traction battery in the future is known. In this case, mandatory power conservation control can be performed on the vehicle according to the minimum power conservation point, so that the remaining power of the traction battery is not less than the minimum power conservation point. This can ensure that the traction battery has sufficient drive power to start the engine when the vehicle is powered on next time, thereby reducing or avoiding the risk of breaking down of the vehicle, increasing the probability of successfully starting the engine, effectively ensuring that the engine can start normally, and ensuring that the vehicle is controllable.

In some embodiments, before the performing mandatory power conservation control on the vehicle according to the minimum power conservation point, the method further includes the following steps:

The remaining power of the traction battery is detected in real time.

If the remaining power of the traction battery drops to a preset power, a user is reminded in a preset interaction method to enable a mandatory power conservation function.

If a confirmation instruction on choosing to enable the mandatory power conservation function is received from the user, mandatory power conservation control is performed on the vehicle according to the minimum power conservation point.

If a confirmation instruction on choosing not to enable the mandatory power conservation function is received from the user, normal power conservation control is performed on the vehicle.

It can be understood that, in this embodiment, the remaining power of the traction battery, that is, an SOC value of the traction battery, may be detected in real time. If the remaining power of the traction battery drops to the preset power, the user is reminded in the preset interaction method to enable the mandatory power conservation function. The preset interaction method is not specifically limited in this embodiment of the present disclosure. Reminding may be performed by sound and/or through a display interface. Exemplarily, a reminder interface may be displayed on a central control screen and assisted by a reminder sound, to remind the user to enable the mandatory power conservation function. When the remaining power of the traction battery drops to the preset power, if no mandatory power conservation is performed, the vehicle is to have a risk of breaking down when the vehicle is powered on next time. The preset power may be determined according to tests and is not specifically limited. In an application scenario, the preset power may be directly set as the minimum power conservation point, or may be set as a value close to the minimum power conservation point, which is not specifically limited.

After the user is reminded in the preset interaction method to enable the mandatory power conservation function, the user may choose whether to enable the mandatory power conservation function. For example, the user may trigger a corresponding location in the reminder interface to determine whether to select the mandatory power conservation function. Therefore, reminding the user in the preset interaction method to enable the mandatory power conservation function can determine in real time a type of the confirmation instruction triggered by the user. If the confirmation instruction on choosing to enable the mandatory power conservation function is received from the user, the mandatory power conservation control is performed on the vehicle according to the minimum power conservation point. If the confirmation instruction on choosing not to enable the mandatory power conservation function is received from the user, the normal power conservation control is performed on the vehicle.

Figure 2:
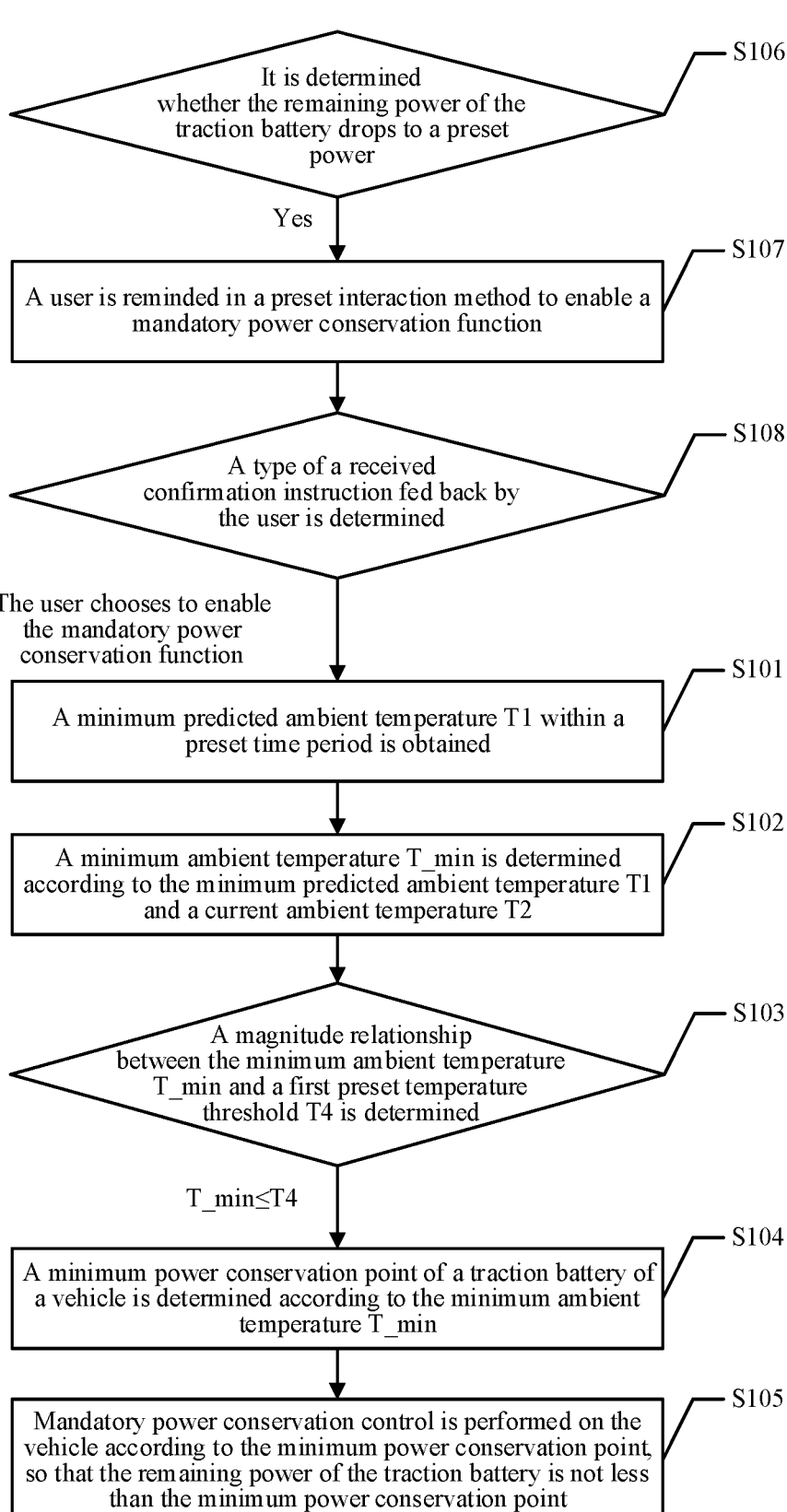
FIG. 2 is another schematic flowchart of a power conservation control method for a vehicle according to an embodiment of the present disclosure.

It should be noted that, in some embodiments, as shown in FIG. 2, steps S101-S105 may be performed after the user chooses to enable the mandatory power conservation function. Specifically, with reference to the foregoing embodiment, as shown in FIG. 2, the method further includes the following steps:

S106: It is determined whether the remaining power of the traction battery drops to a preset power, and if the remaining power of the traction battery drops to the preset power, step S107 is performed.

S107: A user is reminded in a preset interaction method to enable a mandatory power conservation function.

S108: A type of a received confirmation instruction fed back by the user is determined, and if a confirmation instruction on choosing to enable the mandatory power conservation function is received from the user, steps S101-S105 are triggered.

This is not specifically limited. In some other embodiments, alternatively, the minimum power conservation point may be determined in real time first, and finally, after the user enables the mandatory power conservation function, mandatory power conservation is directly performed according to the minimum power conservation point. The sequence of the steps shown in FIG. 2 is for exemplary purposes only herein, and does not cause any limitation on the embodiments of the present disclosure.

Figures 3, 4:
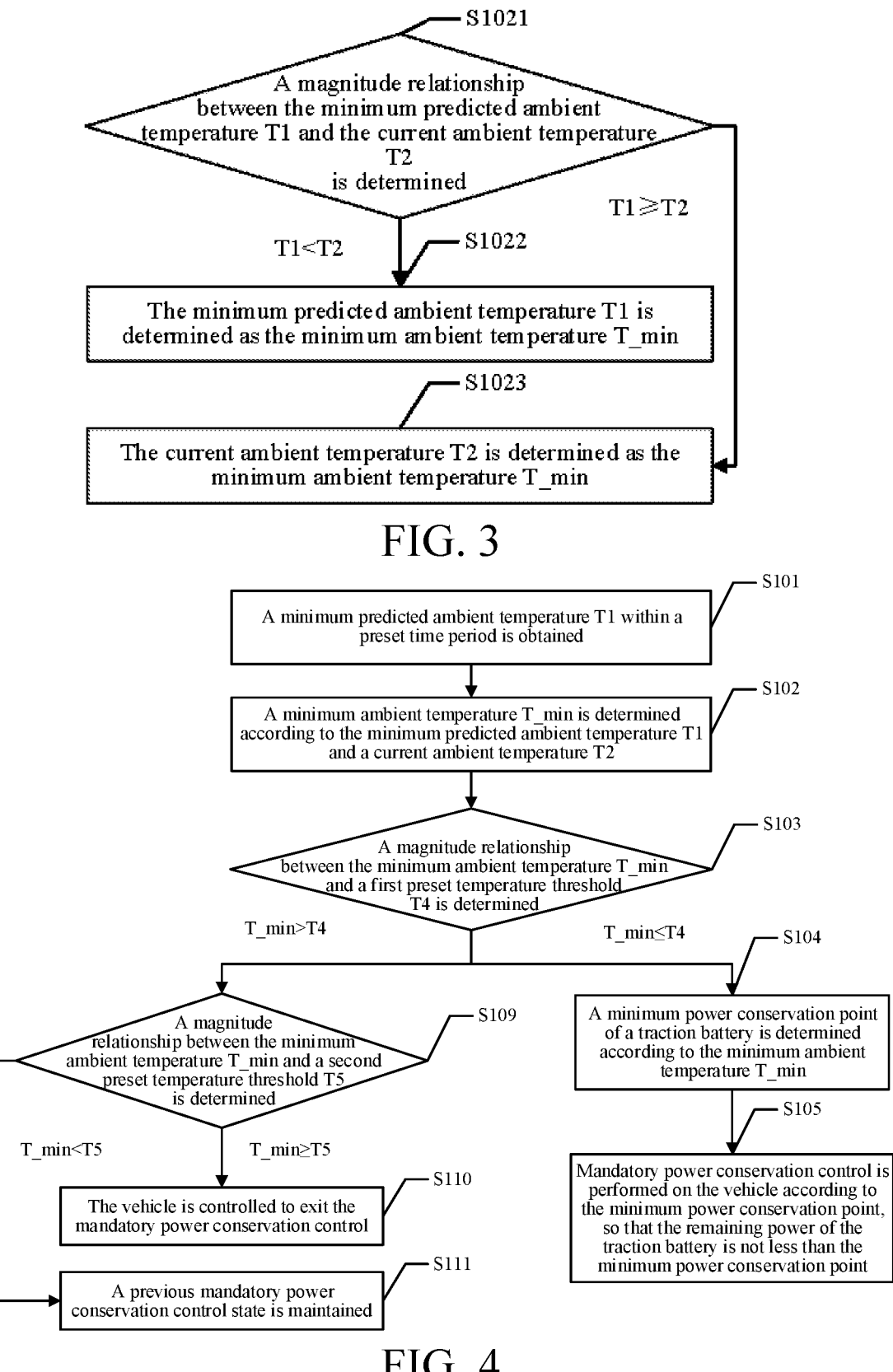
FIG. 3 is a schematic flowchart of a specific implementation of step S102 according to an embodiment of the present disclosure.
FIG. 4 is another schematic flowchart of a power conservation control method for a vehicle according to an embodiment of the present disclosure.

In some embodiments, as shown in FIG. 3, step S102, that is, the determining the minimum ambient temperature T_min according to the minimum predicted ambient temperature T1 and the current ambient temperature T2 specifically includes the following steps:

S1021: A magnitude relationship between the minimum predicted ambient temperature T1 and the current ambient temperature T2 is determined.

S1022: If the minimum predicted ambient temperature T1 is less than the current ambient temperature T2, the minimum predicted ambient temperature T1 is determined as the minimum ambient temperature T_min.

S1023: If the minimum predicted ambient temperature T1 is greater than or equal to the current ambient temperature T2, the current ambient temperature T2 is determined as the minimum ambient temperature T_min.

In this embodiment, after the minimum predicted ambient temperature T1 and the current ambient temperature T2 are obtained in real time, the magnitude relationship between the minimum predicted ambient temperature T1 and the current ambient temperature T2 is determined in real time, to select the minimum ambient temperature T_min to be subsequently faced by the traction battery from the minimum predicted ambient temperature T1 and the current ambient temperature T2. In other words: if $T1 < T2$, $T\_min = T1$, or if $T1 > T2$, $T\_min = T2$.

It can be learned that, in this embodiment, an implementation of specifically determining the minimum ambient temperature T_min according to the minimum predicted ambient temperature T1 and the current ambient temperature T2 is provided. A minimum ambient temperature can be directly determined in the current ambient temperature T2 and the minimum predicted ambient temperature T1 as the minimum ambient temperature T_min, improving implementability and ease of calculation of the solution.

In some embodiments, as shown in FIG. 4, after step S103, that is, after the determining a magnitude relationship the minimum ambient temperature T_min and the first preset temperature threshold T4, the method further includes the following steps:

S109: If the minimum ambient temperature T_min is greater than the first preset temperature threshold T4, a magnitude relationship between the minimum ambient temperature T_min and a second preset temperature threshold T5 is determined.

S110: If the minimum ambient temperature T_min is greater than or equal to the second preset temperature threshold T5, the vehicle is controlled to exit the mandatory power conservation control.

After the magnitude relationship between the minimum ambient temperature T_min and the first preset temperature threshold T4 is determined, it can be learned from the description in the foregoing embodiment that, if the minimum ambient temperature T_min is less than or equal to the first preset temperature threshold T4, it indicates that the traction battery of the vehicle is to face a low-temperature state. In this case, the vehicle needs to be controlled to enter a mandatory power conservation state. Specifically, the minimum power conservation point is determined according to the minimum ambient temperature T_min and mandatory power conservation control is performed on the traction battery according to the minimum power conservation point, to reduce or avoid a problem of subsequently insufficient remaining power of the traction battery, thereby ensuring that there is sufficient discharge power to start the engine during the next power-on.

In this embodiment, if the minimum ambient temperature T_min is greater than the first preset temperature threshold T4, the magnitude relationship between the minimum ambient temperature T_min and the second preset temperature threshold T5 is further determined. If the minimum ambient temperature T_min is greater than or equal to the second preset temperature threshold T5, the vehicle is controlled to exit the mandatory power conservation control.

In some other embodiments, if the minimum ambient temperature T_min is greater than the first preset temperature threshold T4, the magnitude relationship between the minimum ambient temperature T_min and the second preset temperature threshold T5 is further determined. If the minimum ambient temperature T_min is greater than or equal to the second preset temperature threshold T5, normal power conservation control is performed on the vehicle.

It should be noted that, the normal power conservation control is different from the mandatory power conservation control triggered by the mandatory power conservation control function mentioned in the embodiments of the present disclosure. The normal power conservation control refers to a power conservation control policy originally configured for the vehicle, such as power conservation control set for other power conservation requirements. The mandatory power conservation control mentioned in the embodiments of the present disclosure is mandatory power conservation for preventing the vehicle from breaking down and preventing the engine from possibly not starting normally, such as power conservation control triggered after the user selects the mandatory power conservation function. In this embodiment, if the minimum ambient temperature T_min is greater than or equal to the second preset temperature threshold T5, it indicates that an ambient temperature of the vehicle is relatively high, which does not cause the remaining power of the traction battery to be extremely low. In this case, only normal power conservation control needs to be performed on the traction battery, which effectively meeting the operation requirements of the vehicle.

S111: If the minimum ambient temperature T_min is less than the second preset temperature threshold T5, a previous mandatory power conservation control state is maintained.

In this embodiment, if the minimum ambient temperature T_min is less than the second preset temperature threshold T5, the previous mandatory power conservation control state is maintained.

It should be noted that, the previous mandatory power conservation control state may be an ongoing state of the mandatory power conservation control or an exit state of the mandatory power conservation control, which mainly includes the following two aspects:

In a first aspect, as described above, after the mandatory power conservation function is entered, if the minimum ambient temperature T_min is less than or equal to the first preset temperature threshold T4, the minimum power conservation point is determined according to the minimum ambient temperature T_min and the mandatory power conservation control is performed on the traction battery according to the minimum power conservation point, to enter a mandatory power conservation state. Subsequently, the minimum ambient temperature T_min usually changes. When the minimum ambient temperature T_min is less than the second preset temperature threshold T5, the previous mandatory power conservation control state is maintained, that is, the ongoing state of the mandatory power conservation control is maintained. When the minimum ambient temperature T_min is greater than or equal to the second preset temperature threshold T5, the mandatory power conservation control is exited.

In a second aspect, the minimum ambient temperature T_min is less than or equal to the first preset temperature threshold T4, and a corresponding mandatory power conservation control state may be an ongoing state or an exit state. Subsequently, the minimum ambient temperature T_min also changes. If the minimum ambient temperature T_min is less than the second preset temperature threshold T5, the previous mandatory power conservation control state is maintained. For example, if an original state of the mandatory power conservation control is the ongoing state, the mandatory power conservation control state is maintained. If the original state of the mandatory power conservation control is the exit state, the mandatory power conservation control state is maintained. When the minimum ambient temperature T_min is greater than or equal to the second preset temperature threshold T5, the mandatory power conservation control is exited. For example, if the original state of the mandatory power conservation control is the ongoing state, the mandatory power conservation control is exited. If the original state of the mandatory power conservation control is the exit state, the state remains unchanged.

Figure 5:
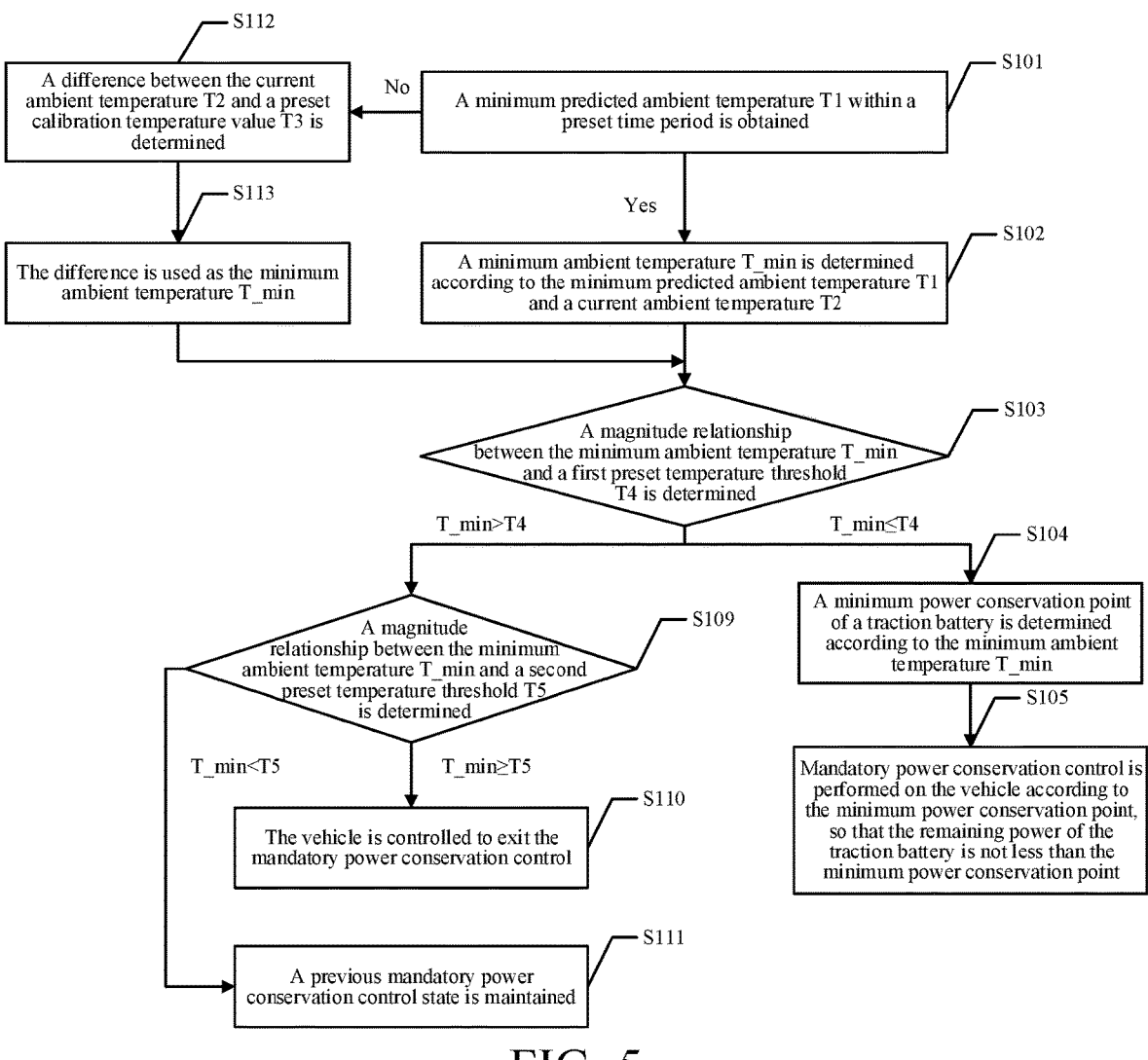
FIG. 5 is another schematic flowchart of a power conservation control method for a vehicle according to an embodiment of the present disclosure.

In some embodiments, as shown in FIG. 5, after S101, that is, after it is determined whether a minimum predicted ambient temperature T1 within a future preset time period is obtained, if no minimum predicted ambient temperature T1 within the future preset time period is obtained, the following steps are performed:

S112: A difference between the current ambient temperature T2 and a preset calibration temperature value T3 is determined. The preset calibration temperature value is a calibration temperature value corresponding to the current ambient temperature.

S113: The difference between the current ambient temperature T2 and the preset calibration temperature value T3 is used as the minimum ambient temperature T_min.

If no minimum predicted ambient temperature T1 within the preset time period is obtained, it indicates that a minimum ambient temperature T_min that may be faced by the vehicle in the future cannot be obtained according to a predicted ambient temperature. In this embodiment, the difference (T2-T3) between the current ambient temperature T2 and the preset calibration temperature value T3 may be determined, and the difference (T2-T3) is used as the minimum ambient temperature T_min.

It should be noted that, the preset calibration temperature value T3 is a temperature value obtained through calibration based on experience. During actual application, the preset calibration temperature value corresponding to the current ambient temperature may be obtained according to calibration tests, to obtain a best temperature value corresponding to the current ambient temperature as the preset calibration temperature value corresponding to the current ambient temperature. For example, calibration tests may be conducted to determine, according to an actual or experimental power conservation effect, a preset calibration temperature value that should correspond to the current ambient temperature at an actual ambient temperature of each moment under different operation conditions of the vehicle (such as different regions and/or time periods), and associated calibration is performed on the preset calibration temperature value corresponding to the current ambient temperature. For example, if $t_{n1}$, $t_{n2}$, $t_{n3}$, . . . , and $t_{nm}$ respectively represents current ambient temperatures corresponding to different moments, $t_{p1}$, $t_{p2}$, $t_{p3}$, . . . , and $t_{pm}$ respectively correspond to calibration temperatures corresponding to $t_{n1}$, $t_{n2}$, $t_{n3}$, . . . , and $t_{nm}$, and respective correspondences are established, to help find a corresponding preset calibration temperature value according to an actual current ambient temperature during specific implementation subsequently.

Therefore, when the minimum predicted ambient temperature T1 within the future preset time period cannot be obtained, the preset calibration temperature value T3 may be obtained according to the current ambient temperature T2, and the difference between the current ambient temperature T2 and the preset calibration temperature value T3 may be used as the minimum ambient temperature T_min, so that mandatory power conservation control logic can be subsequently executed according to the minimum ambient temperature T_min, thereby improving implementability and practicality of the solution, and effectively ensuring the implementation of mandatory power conservation control measures in the event of network unavailability due to communication failures such as Internet failures and when the minimum predicted ambient temperature T1 within the future preset time period cannot be obtained. This further avoids or reduces the risk of breaking down of the vehicle, greatly increases the probability of successfully starting the engine, effectively ensures that the engine can start normally, and ensures that the vehicle is controllable.

In some embodiments, step S104, that is, the determining a minimum power conservation point according to the minimum ambient temperature T_min specifically means that a power conservation point corresponding to the minimum ambient temperature T_min is found from a preset temperature-power conservation point table according to the minimum ambient temperature T_min, as the minimum power conservation point.

It should be noted that, the preset temperature-power conservation point table stores various minimum ambient temperatures T_min and corresponding minimum power conservation points. Correspondences between the minimum ambient temperatures T_min and the corresponding minimum power conservation points in the table may be obtained through calibration based on real-vehicle tests.

In some embodiments, a correspondence between the minimum ambient temperature T_min and the corresponding minimum power conservation point in the temperature-power conservation point table is obtained in the following calibration manner: To achieve an optimal mandatory power conservation effect of a real vehicle in operation to obtain minimum power conservation points corresponding to different minimum ambient temperatures T_min, calibration tests of the minimum power conservation points may be conducted through the real vehicle first. Specifically, A minimum ambient temperature to be possibly faced by the vehicle within a preset time period may be simulated, and the remaining power of the traction battery is fixed. Tests are conducted according to the simulated minimum ambient temperature and the remaining power, and tests are conducted through preset mandatory power conservation measures to obtain a current mandatory power conservation effect. The remaining power of the traction battery is changed and the tests are constantly repeated, to determine the minimum remaining power that can conform to a preset mandatory power conservation effect (the engine can start normally) as a minimum power conservation point corresponding to the minimum ambient temperature. Then, the minimum ambient temperature is constantly changed and the tests are repeated to obtain minimum power conservation points corresponding to different minimum ambient temperatures. In this way, the minimum power conservation point corresponding to the different minimum ambient temperatures and obtained through the tests can be used to obtain the foregoing temperature-power conservation point table.

It should be noted that, to improve implementability and practicality of the solution, the present disclosure provides various manners of performing mandatory power conservation control on the vehicle according to the minimum power conservation point, including the optimization of the engine, the generator, the drive motor, and other aspects, to ensure the success rate of starting the engine. The manners are separately described below.

Figure 6:
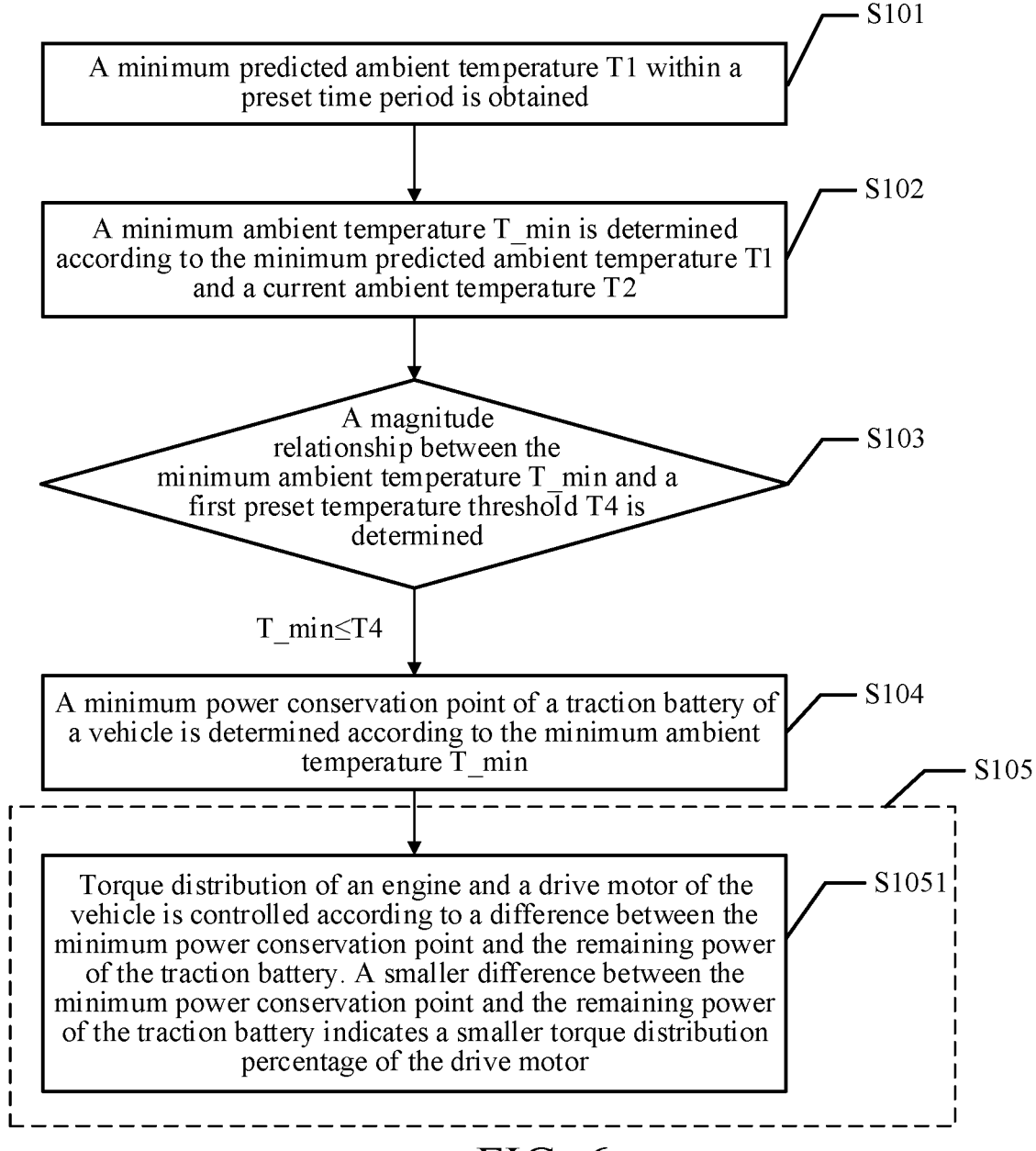
FIG. 6 is a flowchart of a first-aspect embodiment of step S105 according to an embodiment of the present disclosure.

In a first aspect, as shown in FIG. 6, optimization is to be performed in terms of torque distribution of the drive motor of the vehicle.

In some embodiments, step S105, that is, the performing mandatory power conservation control on the vehicle according to the minimum power conservation point specifically includes:

S1051: Torque distribution of an engine and a drive motor of the vehicle is controlled according to a difference between the minimum power conservation point and the remaining power of the traction battery. A smaller difference between the minimum power conservation point and the remaining power of the traction battery indicates a smaller torque distribution percentage of the drive motor.

It can be understood that, after the engine starts and enters parallel drive, the drive source includes the engine and the drive motor. In this case, there is a torque distribution relationship. Usually, torque distribution of the drive motor is related to the remaining power (SOC) of the traction battery and a vehicle speed.

Table 1 shows an SOC-drive motor torque distribution percentage:

TABLE 1

| SOC % | s1 | s2 |
|---|---|---|
| Drive motor torque distribution percentage % | k1 | k2 |

13

14

For ease of understanding of the relationship between the SOC and distributed torque of the drive motor, two torque distribution points are set herein, and the drive motor torque distribution percentage changes linearly between the two SOC points, where s1<s2, and k1<k2. That is, the SOC and the drive motor torque distribution percentage are linearly and positively correlated.

Table 2 shows a vehicle speed-drive motor torque distribution percentage:

TABLE 2

| Vehicle speed km/h | s3 | s4 |
|---|---|---|
| Drive motor torque distribution percentage % | k3 | k4 |

For ease of understanding of the relationship between the vehicle speed and distributed torque of the drive motor, two torque distribution points are set herein, and the drive motor torque distribution percentage changes linearly between the two vehicle speed points, where s3<s4, and k3>k4. That is, the vehicle speed and the drive motor torque distribution percentage are linearly and negatively correlated.

When the mandatory power conservation is not performed, a smallest percentage of a torque distribution percentage determined according to the vehicle speed-drive motor torque distribution relationship and a torque distribution percentage determined according to the SOC-drive motor torque distribution relationship is selected as the torque distribution percentage of the drive motor. In this embodiment of the present disclosure, after the mandatory power conservation is determined, the difference between the minimum power conservation point and the remaining power of the traction battery is determined, and the difference is associated with the torque distribution percentage of the drive motor (for example, k1-k4 in the foregoing tables). Specifically, Under the condition of meeting a drive demand of the vehicle, a smaller difference indicates a stronger mandatory power conservation demand, and in this case, the torque distribution of the drive motor is reduced. That is, a smaller difference indicates less torque distribution of the engine, thereby reducing power consumption of the drive motor, and reducing power consumption of the traction battery, which achieves the purpose of mandatory power conservation, and effectively ensures a success rate of starting the engine subsequently.

It can be learned that, in this embodiment, the torque distribution of the drive motor of the vehicle is optimized according to the minimum power conservation point, which effectively reduces drive power consumption of the drive motor, thereby reducing power consumption of the traction battery, achieving the purpose of mandatory power conservation, making it easier for the engine to start, and improving a success rate of starting the engine.

Figure 7:
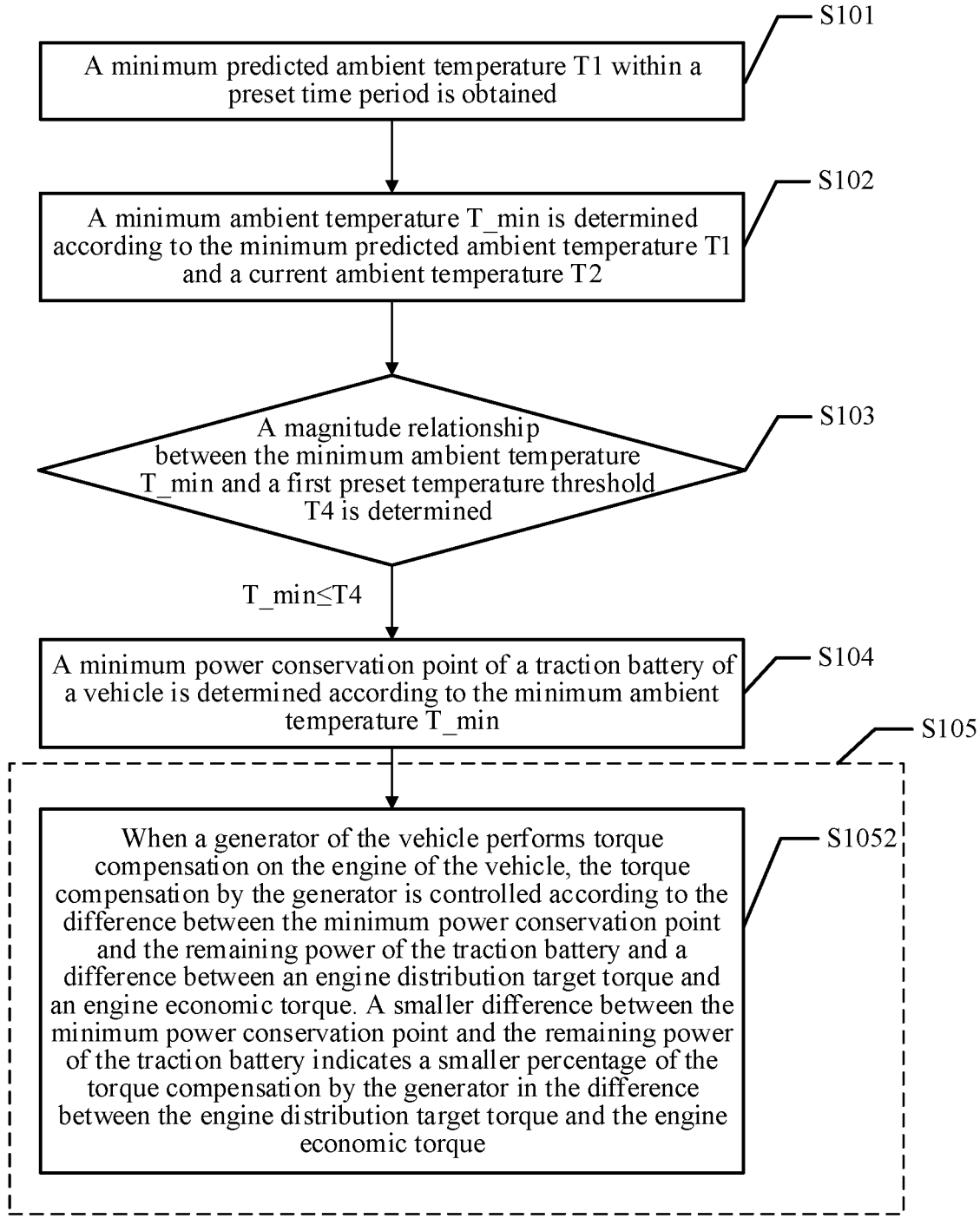
FIG. 7 is a flowchart of a second-aspect embodiment of step S105 according to an embodiment of the present disclosure.

In a second aspect, as shown in FIG. 7, optimization is to be performed in terms of torque compensation of a generator of the vehicle.

In some embodiments, step S105, that is, the performing mandatory power conservation control on the vehicle according to the minimum power conservation point specifically refers to the following step:

S1052: When a generator of the vehicle performs torque compensation on the engine of the vehicle, the torque compensation by the generator is controlled according to the difference between the minimum power conservation point and the remaining power of the traction battery and a difference between an engine distribution target torque and an engine economic torque. A smaller difference between the minimum power conservation point and the remaining power of the traction battery indicates a smaller percentage of the torque compensation by the generator in the difference between the engine distribution target torque and the engine economic torque.

It can be understood that, for economic considerations, after the engine starts and enters parallel drive, the torque of the engine works at the economic torque as a priority when the distributed torque is known. However, the drive requirement of the whole vehicle is constantly changing, and the economic torque distributed in advance may be redundant or insufficient. Therefore, the generator is usually allowed to work in a power generation or booster state, so that the torque of the engine is compensated by the generator to make the engine always work in an economic zone. The torque of the booster part of the generator=(engine distribution target torque–engine economic torque)*k5. It can be learned that, a larger value of k5 indicates a faster power response of the whole vehicle and faster relative power consumption. In this embodiment of the present disclosure, after the mandatory power conservation is determined, the difference between the minimum power conservation point and the remaining power of the traction battery is determined, and the difference is associated with the torque compensation by the generator. During the torque compensation, the torque compensation by the generator is controlled according to the difference between the minimum power conservation point and the remaining power of the traction battery. A smaller difference between the minimum power conservation point and the remaining power of the traction battery indicates a smaller percentage of the torque compensation by the generator in the difference between the engine distribution target torque and the engine economic torque. It can be understood that, a larger difference between the minimum power conservation point and the remaining power of the traction battery indicates more sufficient remaining power of the traction battery. In this case, the power response of the whole vehicle is preferentially ensured, and there is more torque compensation by the generator. A smaller difference between the minimum power conservation point and the remaining power of the traction battery indicates possible insufficient remaining power of the traction battery. In this case, the torque compensation by the generator may be reduced. For example, the value of k5 may be reduced. In this way, the torque compensation by the generator is reduced, and the compensation power consumption of the generator is reduced, thereby reducing the power consumption of the traction battery, achieving the purpose of mandatory power conservation, and improving a success rate of starting the engine subsequently.

It can be learned that, in this embodiment, the torque compensation by the generator is optimized according to the minimum power conservation point, which effectively reduces the power consumption of the torque compensation by the generator, and reduces the power consumption of the traction battery, thereby making it easier for the engine to start, and improving a success rate of starting the engine.

In a third aspect, as shown in FIG. 8, optimization is to be performed in terms of power generation by the generator of the vehicle.

In some embodiments, step S105, that is, the performing mandatory power conservation control on the vehicle according to the minimum power conservation point specifically refers to the following step:

S1053: A minimum power generation point of the generator of the vehicle is set as the minimum power conservation point, so that when the remaining power of the traction battery is less than or equal to the minimum power generation point, the generator is triggered to generate power to charge the traction battery. Alternatively, generating power of the generator is increased, so that the power of the traction battery is not less than the minimum power conservation point.

It can be understood that, the generator has a minimum power generation point, and when the remaining power of the traction battery is less than or equal to the minimum power generation point, the generator starts power generation. In this embodiment, after the mandatory power conservation is determined, the minimum power generation point of the generator is set as the minimum power conservation point, so that when the traction battery is at the minimum power conservation point, the generator is triggered to generate power to charge the traction battery. In this way, the generator can generate power as far as possible to the minimum power conservation point when a power generation condition is met, which effectively ensures that the remaining power of the traction battery is not less than the minimum power conservation point, thereby ensuring that the engine has sufficient drive power, and greatly improving a success rate of starting the engine.

In addition, the generating power of the generator is limited by the economy of the whole vehicle, NVH characteristics requirements, the input power of the battery, and the like. In this embodiment of the present disclosure, after the mandatory power conservation is determined, the limitations of the economy of the whole vehicle, the NVH characteristics requirements, the input power of the battery, and the like are appropriately released, and the generating power is increased as much as possible, so that the power of the traction battery remains above the minimum power conservation point as much as possible, thereby effectively ensuring that the engine has sufficient drive power, and greatly improving a success rate of starting the engine.

It can be learned that, in this embodiment, according to the minimum power conservation point, optimization is performed in terms of power generation by the generator, which effectively ensures the power of the traction battery, allowing the engine to have sufficient power, thereby making it easier for the engine to start, and improving a success rate of starting the engine.

Figure 9:
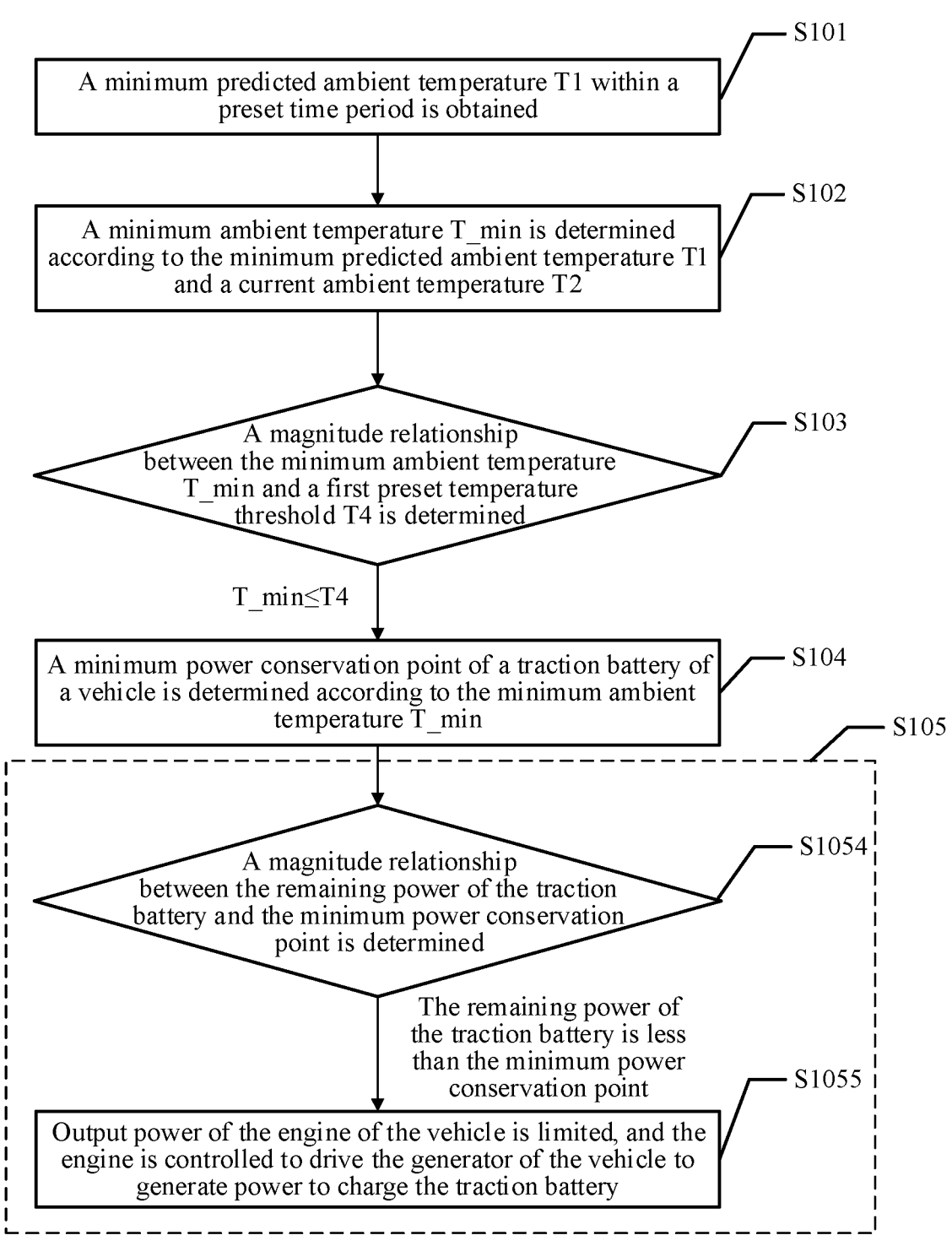
FIG. 9 is a flowchart of a fourth-aspect embodiment of step S105 according to an embodiment of the present disclosure.

In a fourth aspect, as shown in FIG. 9, optimization is to be performed in terms of torque limitation of the generator.

In some embodiments, step S105, that is, the performing mandatory power conservation control on the vehicle according to the minimum power conservation point specifically refers to the following step:

S1054: A magnitude relationship between the remaining power of the traction battery and the minimum power conservation point is determined.

S1055: If the remaining power of the traction battery is less than the minimum power conservation point, output power of the engine of the vehicle is limited, and the engine is controlled to drive the generator of the vehicle to generate power to charge the traction battery. The output power of the engine refers to the power of the engine driving the vehicle.

It can be understood that, when the mandatory power conservation is not performed, when the remaining power of the traction battery is less than a torque limitation threshold, the output power of the engine is limited, and the engine is controlled to drive the generator to generate power to charge the traction battery. In this embodiment, after the mandatory power conservation is determined, the torque limitation threshold is set as the minimum power conservation point.

Therefore, if the remaining power of the traction battery is less than the minimum power conservation point, the output power of the engine is limited, and the engine is controlled to drive the generator to generate power to charge the traction battery, thereby improving a power conservation capability and achieving the purpose of mandatory power conservation.

It can be learned that, in this embodiment, according to the minimum power conservation point, optimization is performed in terms of the torque limitation of the generator, which effectively reduces the power consumption caused by the output power of the engine, and charges the traction battery through the power generation path, thereby reducing the power consumption of the traction battery, making it easier for the engine to start, and improving a success rate of starting the engine.

Figures 10, 11:
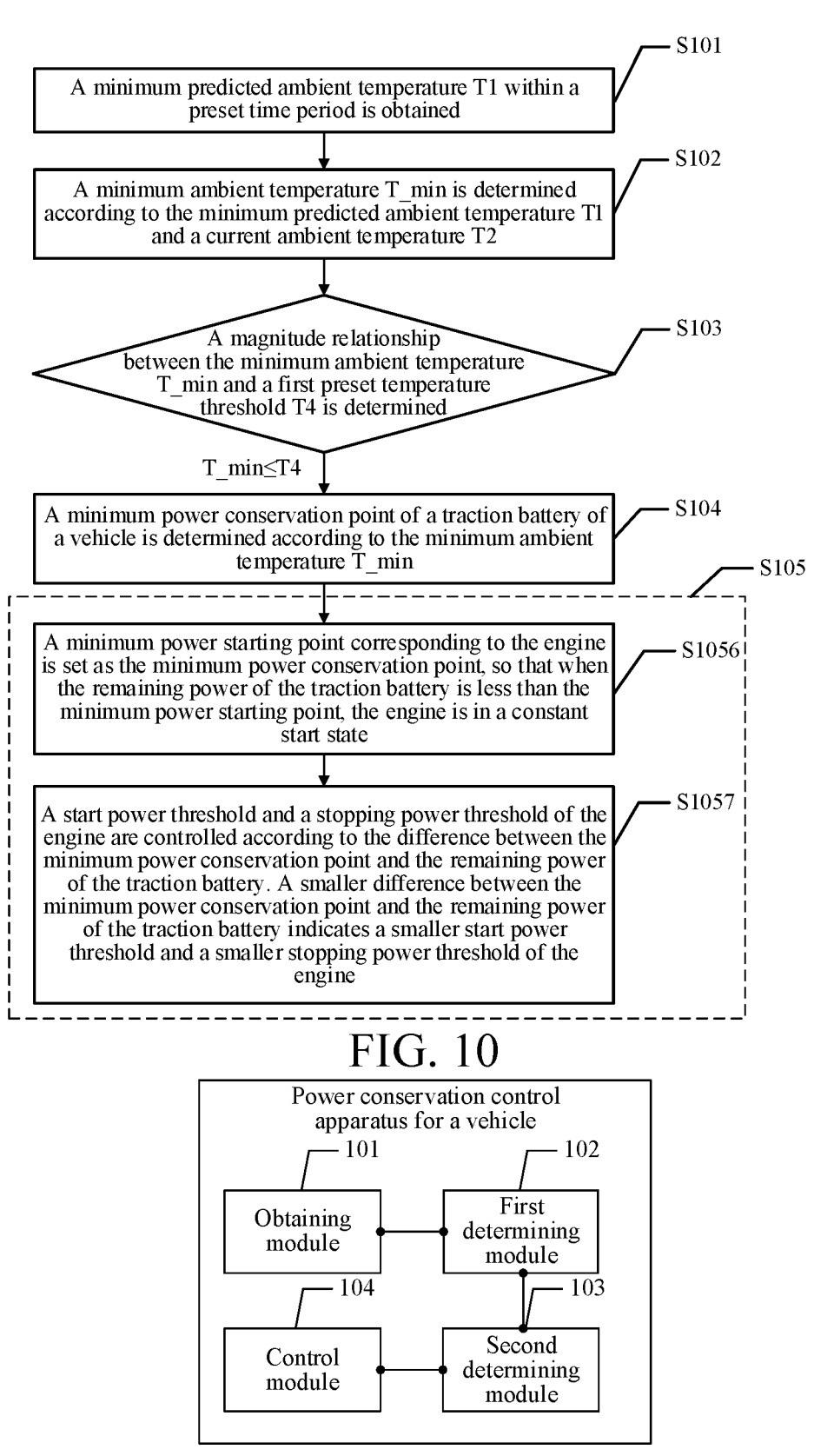
FIG. 10 is a flowchart of a fifth-aspect embodiment of step S105 according to an embodiment of the present disclosure.
FIG. 11 is a schematic structural diagram of a power conservation control apparatus for a vehicle according to an embodiment of the present disclosure.

In a fifth aspect, as shown in FIG. 10, optimization is to be performed in terms of starting and stopping of the engine.

In some embodiments, in step S105, that is, after the performing mandatory power conservation control on the vehicle according to the minimum power conservation point, the following steps may be further included:

S1056: A minimum power starting point corresponding to the engine is set as the minimum power conservation point, so that when the remaining power of the traction battery is less than the minimum power starting point, the engine is in a constant start state.

S1057: A start power threshold and a stopping power threshold of the engine are controlled according to the difference between the minimum power conservation point and the remaining power of the traction battery. A smaller difference between the minimum power conservation point and the remaining power of the traction battery indicates a smaller start power threshold and a smaller stopping power threshold of the engine.

It can be understood that, the engine of the vehicle has a minimum power starting point, and when the remaining power of the traction battery is less than the minimum power starting point, the engine is in a constant start state. That the engine is in a constant start state means that the engine is in a state that the engine is prohibited from stopping. If the engine is stopped, it needs to take some time for the engine to start again. During this period, if the user still has a relatively large drive demand, it can be met only by the traction battery outputting electric energy. Therefore, if the engine is frequently stopped and started, the power conservation effect cannot be achieved. In the constant start state, the engine can participate in driving or power generation at any time according to requirements.

In the mandatory power conservation control manner, the minimum power starting point corresponding to the engine is set as the minimum power conservation point. In this way, when the remaining power of the traction battery is less than the minimum power starting point, the engine can be controlled to be in the constant start state, that is, the engine is maintained in a standby state, thereby avoiding a subsequent problem of possibly unsuccessful start of the engine caused by the temperature affect.

In addition, usually, at a particular speed and remaining power, when the drive power of the engine is greater than the start power threshold, the engine is started to participate in driving or discharging. When the drive power of the engine is less than the stopping power threshold, the engine stops and the drive motor is preferentially used for driving. In the mandatory power conservation manner, the difference between the minimum power conservation point and the remaining power of the traction battery is determined, and the difference is associated with the start power threshold and the stopping power threshold. A smaller difference indicates a smaller start power threshold and a smaller stopping power threshold, thereby making it easier for the engine to start and more difficult for the engine to stop, and effectively improving a success rate and time of starting the engine.

It can be learned that, in this embodiment, according to the minimum power conservation point, optimization is performed on starting of the engine in terms of starting and stopping of the engine, thereby making it easier for the engine to start, and improving a success rate of starting.

It should be noted that, the various manners of performing mandatory power conservation control on the vehicle according to the minimum power conservation point described in the foregoing embodiments are only exemplary descriptions herein. In addition, the foregoing various manners of performing mandatory power conservation control on the vehicle according to the minimum power conservation point may be combined for use according to actual application scenarios and requirements, which are not specifically limited. Additionally, optimization parameters involved in the various manners of performing mandatory power conservation control on the vehicle according to the minimum power conservation point may be determined according to actual tests or simulation. For example, during the torque compensation, a smaller difference between the minimum power conservation point and the remaining power of the traction battery indicates less torque compensation by the generator. Specific parameters involved in an amount of reduced torque compensation by the generator may be determined according to actual tests or simulation, which are not described herein, and no further description is provided.

It should be understood that, the sequence numbers of the steps in the foregoing embodiments do not imply the order of execution, and the order of execution of each process should be determined by the function and internal logic thereof, and should not constitute any limitation to the implementation process of the embodiments of the present disclosure.

In some embodiments, a power conservation control apparatus for a vehicle is provided. The power conservation control apparatus for a vehicle corresponds to the power conservation control method for a vehicle in the foregoing embodiments. As shown in FIG. 11, the power conservation control apparatus for a vehicle includes an obtaining module 101, a first determining module 102, a second determining module 103, and a control module 104. The functional modules are described in detail as follows:

The obtaining module 101 is configured to obtain a minimum predicted ambient temperature within a preset time period.

The first determining module 102 is configured to determine a minimum ambient temperature according to the minimum predicted ambient temperature and a current ambient temperature.

The second determining module 103 is configured to determine a minimum power conservation point of a traction battery of the vehicle according to the minimum ambient temperature if the minimum ambient temperature is less than or equal to a first preset temperature threshold.

The control module 104 is configured to perform mandatory power conservation control on the vehicle according to the minimum power conservation point, so that the remaining power of the traction battery is not less than the minimum power conservation point.

In some embodiments, the power conservation control apparatus for a vehicle further includes a detection module and a reminder module.

The detection module is configured to detect the remaining power of the traction battery in real time before mandatory power conservation control is performed on the vehicle according to the minimum power conservation point.

The reminder module is configured to: if the remaining power of the traction battery drops to a preset power, remind a user in a preset interaction method to enable a mandatory power conservation function.

The control module 104 is configured to perform mandatory power conservation control on the vehicle according to the minimum power conservation point if a confirmation instruction on choosing to enable the mandatory power conservation function is received from the user.

In some embodiments, the control module 104 is specifically configured to:

control torque distribution of an engine and a drive motor of the vehicle according to a difference between the minimum power conservation point and the remaining power of the traction battery, where a smaller difference between the minimum power conservation point and the remaining power of the traction battery indicates a smaller torque distribution percentage of the drive motor.

In some embodiments, the control module 104 is specifically configured to:

when a generator of the vehicle performs torque compensation on the engine of the vehicle, control the torque compensation by the generator according to the difference between the minimum power conservation point and the remaining power of the traction battery and a difference between an engine distribution target torque and an engine economic torque, where a smaller difference between the minimum power conservation point and the remaining power of the traction battery indicates a smaller percentage of the torque compensation by the generator in the difference between the engine distribution target torque and the engine economic torque.

In some embodiments, the control module 104 is specifically configured to:

set a minimum power generation point of the generator of the vehicle as the minimum power conservation point, and when the remaining power of the traction battery is less than or equal to the minimum power generation point, trigger the generator to generate power to charge the traction battery; or increase generating power of the generator, so that the remaining power of the traction battery is not less than the minimum power conservation point.

In some embodiments, the control module 104 is specifically configured to:

determine a magnitude relationship between the remaining power of the traction battery and the minimum power conservation point; and if the remaining power of the traction battery is less than the minimum power conservation point, limit output power of the engine of the vehicle, and control the engine to drive the generator of the vehicle to generate power to charge the traction battery.

In some embodiments, the control module 104 is further configured to:

after the minimum power conservation point of the traction battery is determined according to the minimum ambient temperature T_min, set a minimum power starting point corresponding to the engine of the vehicle as the minimum power conservation point, where when the remaining power of the traction battery is less than the minimum power starting point, the engine is in a constant start state; and control a start power threshold and a stopping power threshold of the engine according to the difference between the minimum power conservation point and the remaining power of the traction battery, where a smaller difference between the minimum power conservation point and the remaining power of the traction battery indicates a smaller start power threshold and a smaller stopping power threshold of the engine.

In some embodiments, the first determining module 102 is specifically configured to:

determine a magnitude relationship between the minimum predicted ambient temperature and the current ambient temperature; and if the minimum predicted ambient temperature is less than the current ambient temperature, determine the minimum predicted ambient temperature as the minimum ambient temperature; or if the minimum predicted ambient temperature is greater than or equal to the current ambient temperature, determine the current ambient temperature as the minimum ambient temperature.

In some embodiments, the second determining module 103 is further configured to: if the minimum ambient temperature is greater than the first preset temperature threshold, determine a magnitude relationship between the minimum ambient temperature and a second preset temperature threshold.

The control module 104 is further configured to: if the minimum ambient temperature is greater than or equal to the second preset temperature threshold, control the vehicle to exit the mandatory power conservation control; or if the minimum ambient temperature is less than the second preset temperature threshold, maintain a previous mandatory power conservation control state.

In some embodiments, the second determining module 102 is specifically configured to:

if no minimum predicted ambient temperature within the preset time period is obtained, determine a difference between the current ambient temperature and a preset calibration temperature value, where the preset calibration temperature value is a calibration temperature value corresponding to the current ambient temperature; and use the difference between the current ambient temperature and the preset calibration temperature value as the minimum ambient temperature.

It can be learned that, according to the power conservation control apparatus for a vehicle provided in the embodiments of the present disclosure, after a minimum power conservation point is obtained, a minimum remaining power value that can enable the engine to start normally at a minimum ambient temperature T_min to be faced by the traction battery in the future is known. In this case, mandatory power conservation control can be performed on the vehicle according to the minimum power conservation point, so that the remaining power of the traction battery is not less than the minimum power conservation point. This can ensure that the traction battery has sufficient drive power to start the engine when the vehicle is powered on next time, thereby reducing or avoiding the risk of breaking down of the vehicle, increasing the probability of successfully starting the engine, effectively ensuring that the engine can start normally, and ensuring that the vehicle is controllable.

For a specific limitation on the power conservation control apparatus for a vehicle, refer to the limitation on the power conservation control method for a vehicle above. Details are not described herein again. All or some of the modules in the power conservation control apparatus for a vehicle may be implemented through software, hardware, or a combination thereof. The modules may be embedded in or independent of a processor of a computer device in a form of hardware, or stored in a memory of the computer device in a form of software, so that the processor can easily invoke and execute corresponding operations of the modules.

In an embodiment, a power conservation control apparatus for a vehicle is provided. The power conservation control apparatus for a vehicle includes a processor and a memory connected by a system bus. The processor of the power conservation control apparatus for a vehicle is configured to provide computing and control capabilities. The memory of the power conservation control apparatus for a vehicle includes a non-volatile storage medium and an internal memory. The non-volatile storage medium stores an operating system and a computer program. The internal memory provides an environment for the running of the operating system and the computer program in the non-volatile storage medium. The computer program, when executed by the processor, implements a power conservation control method for a vehicle.

Figure 12:
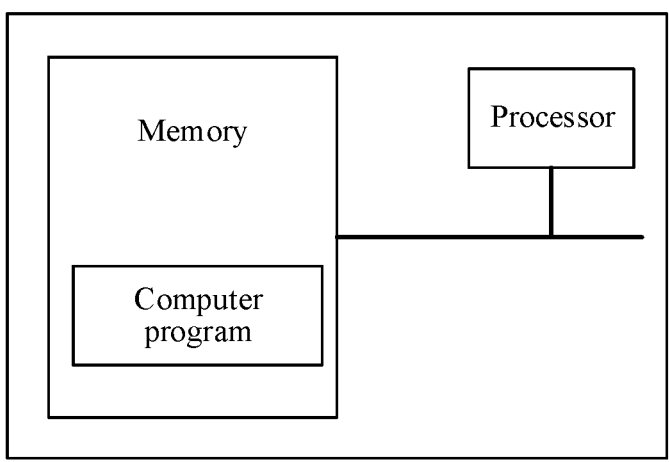
FIG. 12 is another schematic structural diagram of a power conservation control apparatus for a vehicle according to an embodiment of the present disclosure.

In an embodiment, as shown in FIG. 12, a power conservation control apparatus for a vehicle is provided, which includes a memory, a processor, and a computer program stored in the memory and executable on the processor. The processor executes the computer program to implement the following steps:

A minimum predicted ambient temperature within a preset time period is obtained.

A minimum ambient temperature is determined according to the minimum predicted ambient temperature and a current ambient temperature.

If the minimum ambient temperature is less than or equal to a first preset temperature threshold, a minimum power conservation point of a traction battery is determined according to the minimum ambient temperature.

Mandatory power conservation control is performed on the vehicle according to the minimum power conservation point, so that the remaining power of the traction battery is not less than the minimum power conservation point.

In an embodiment, a readable storage medium is provided, which stores a computer program. The computer program, when executed by a processor, implements the following steps:

A minimum predicted ambient temperature within a preset time period is obtained.

A minimum ambient temperature is determined according to the minimum predicted ambient temperature and a current ambient temperature.

If the minimum ambient temperature is less than or equal to a first preset temperature threshold, a minimum power conservation point of a traction battery is determined according to the minimum ambient temperature.

Mandatory power conservation control is performed on the vehicle according to the minimum power conservation point, so that the remaining power of the traction battery is not less than the minimum power conservation point.

Those of ordinary skill in the art may understand that all or some of the procedures of the methods in the foregoing embodiments may be implemented by a computer program instructing relevant hardware. The computer program may be stored in a non-volatile computer-readable storage medium. When the computer program is executed, the procedures of the foregoing method embodiments may be implemented. References to the memory, the storage, the database, or other medium used in the embodiments provided in the present disclosure may all include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of description rather than limitation, the RAM may be obtained in multiple forms, such as a static RAM (SRAM), a dynamic RAM (DRAM), a synchronous DRAM (SDRAM), a double data rate SDRAM (DDRSDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

Those skilled in the art can clearly understand that, for convenience and brevity of description, the division of the foregoing functional units and modules is merely an example for description. In practical application, the foregoing functions may be allocated to and completed by different functional units and modules according to requirements, that is, the internal structure of the apparatus is divided into different functional units or modules, to complete all or some of the functions described above.

It can be learned that, in the solutions provided in the embodiments, after a minimum power conservation point is obtained according to a future low ambient temperature, a minimum remaining power value that can enable the engine to start normally in the future is known. In this case, mandatory power conservation control can be performed on the vehicle according to the minimum power conservation point, so that the remaining power of the traction battery can be not less than the minimum power conservation point. This can ensure that the traction battery has sufficient drive power to start the engine when the vehicle is powered on next time, which increases the probability of successfully starting the engine, thereby reducing or avoiding the risk of breaking down of the vehicle, and effectively ensuring that the engine can start normally.

The foregoing embodiments are merely intended for describing the technical solutions of the present disclosure, but not for limiting the present disclosure. Although the present disclosure is described in detail with reference to the foregoing embodiments, it should be appreciated by those of ordinary skill in the art that, modifications may still be made to the technical solutions described in the foregoing embodiments, or equivalent replacements may be made to some of the technical features. However, these modifications or replacements do not cause the essence of corresponding technical solutions to depart from the spirit and scope of the technical solutions of the embodiments of the present disclosure, and should all fall within the protection scope of the present disclosure.

What is claimed is:

1. A power conservation control method for a vehicle, comprising:
    obtaining a minimum predicted ambient temperature within a preset time period;
    determining a minimum ambient temperature according to the minimum predicted ambient temperature and a current ambient temperature;

determining a minimum power conservation point of a traction battery of the vehicle according to the minimum ambient temperature that is less than or equal to a first preset temperature threshold; and
    performing mandatory power conservation control on the vehicle according to the minimum power conservation point, so that the remaining power of the traction battery is not less than the minimum power conservation point;
    wherein before the performing mandatory power conservation control on the vehicle according to the minimum power conservation point, the method comprises:
    detecting the remaining power of the traction battery in real time;
    the remaining power of the traction battery dropping to a preset power, reminding a user in a preset interaction method to enable a mandatory power conservation function; and
    a confirmation instruction on choosing to enable the mandatory power conservation function being received from the user, performing mandatory power conservation control on the vehicle according to the minimum power conservation point;
    wherein the method further comprises:
    no minimum predicted ambient temperature within the preset time period being obtained,
    determining a difference between the current ambient temperature and a preset calibration temperature value, wherein the preset calibration temperature value is a calibration temperature value corresponding to the current ambient temperature at an actual ambient temperature of each moment under different operation conditions of the vehicle; and
    using the difference between the current ambient temperature and the preset calibration temperature value as the minimum ambient temperature.

2. The power conservation control method for a vehicle according to claim 1, wherein the performing mandatory power conservation control on the vehicle according to the minimum power conservation point comprises:
    controlling torque distribution of an engine and a drive motor of the vehicle according to a difference between the minimum power conservation point and the remaining power of the traction battery, wherein a smaller difference between the minimum power conservation point and the remaining power of the traction battery indicates a smaller torque distribution percentage of the drive motor.

3. The power conservation control method for a vehicle according to claim 1, wherein the performing mandatory power conservation control on the vehicle according to the minimum power conservation point comprises:
    a generator of the vehicle performing torque compensation on the engine of the vehicle; controlling the torque compensation by the generator according to the difference between the minimum power conservation point and the remaining power of the traction battery and a difference between an engine distribution target torque and an engine economic torque, wherein a smaller difference between the minimum power conservation point and the remaining power of the traction battery indicates a smaller percentage of the torque compensation by the generator in the difference between the engine distribution target torque and the engine economic torque.

4. The power conservation control method for a vehicle according to claim 2, wherein the performing mandatory power conservation control on the vehicle according to the minimum power conservation point comprises:

a generator of the vehicle performing torque compensation on the engine of the vehicle; controlling the torque compensation by the generator according to the difference between the minimum power conservation point and the remaining power of the traction battery and a difference between an engine distribution target torque and an engine economic torque, wherein a smaller difference between the minimum power conservation point and the remaining power of the traction battery indicates a smaller percentage of the torque compensation by the generator in the difference between the engine distribution target torque and the engine economic torque.

5. The power conservation control method for a vehicle according to claim 1, wherein the performing mandatory power conservation control on the vehicle according to the minimum power conservation point comprises:

setting a minimum power generation point of a generator of the vehicle as the minimum power conservation point, and when the remaining power of the traction battery is less than or equal to the minimum power generation point, triggering the generator to generate power to charge the traction battery;

or increasing generating power of the generator, so that the remaining power of the traction battery is not less than the minimum power conservation point.

6. The power conservation control method for a vehicle according to claim 2, wherein the performing mandatory power conservation control on the vehicle according to the minimum power conservation point comprises:

setting a minimum power generation point of a generator of the vehicle as the minimum power conservation point, and when the remaining power of the traction battery is less than or equal to the minimum power generation point, triggering the generator to generate power to charge the traction battery;

or increasing generating power of the generator, so that the remaining power of the traction battery is not less than the minimum power conservation point.

7. The power conservation control method for a vehicle according to claim 4, wherein the performing mandatory power conservation control on the vehicle according to the minimum power conservation point comprises:

setting a minimum power generation point of the generator of the vehicle as the minimum power conservation point, and when the remaining power of the traction battery is less than or equal to the minimum power generation point, triggering the generator to generate power to charge the traction battery;

or increasing generating power of the generator, so that the remaining power of the traction battery is not less than the minimum power conservation point.

8. The power conservation control method for a vehicle according to claim 1, wherein the performing mandatory power conservation control on the vehicle according to the minimum power conservation point comprises:

determining a magnitude relationship between the remaining power of the traction battery and the minimum power conservation point; and the remaining power of the traction battery being less than the minimum power conservation point, limiting output power of the engine of the vehicle, and controlling the engine to drive a generator of the vehicle to generate power to charge the traction battery.

9. The power conservation control method for a vehicle according to claim 4, wherein the performing mandatory power conservation control on the vehicle according to the minimum power conservation point comprises:

determining a magnitude relationship between the remaining power of the traction battery and the minimum power conservation point; and the remaining power of the traction battery being less than the minimum power conservation point, limiting output power of the engine of the vehicle, and controlling the engine to drive the generator of the vehicle to generate power to charge the traction battery.

10. The power conservation control method for a vehicle according to claim 1, wherein after the determining a minimum power conservation point of a traction battery according to the minimum ambient temperature, the method further comprises:

setting a minimum power starting point corresponding to the engine of the vehicle as the minimum power conservation point, so that when the remaining power of the traction battery is less than the minimum power starting point, the engine is in a constant start state; and controlling a start power threshold and a stopping power threshold of the engine according to the difference between the minimum power conservation point and the remaining power of the traction battery, wherein a smaller difference between the minimum power conservation point and the remaining power of the traction battery indicates a smaller start power threshold and a smaller stopping power threshold of the engine.

11. The power conservation control method for a vehicle according to claim 9, wherein after the determining a minimum power conservation point of a traction battery according to the minimum ambient temperature, the method further comprises:

setting a minimum power starting point corresponding to the engine of the vehicle as the minimum power conservation point, so that when the remaining power of the traction battery is less than the minimum power starting point, the engine is in a constant start state; and controlling a start power threshold and a stopping power threshold of the engine according to the difference between the minimum power conservation point and the remaining power of the traction battery, wherein a smaller difference between the minimum power conservation point and the remaining power of the traction battery indicates a smaller start power threshold and a smaller stopping power threshold of the engine.

12. The power conservation control method for a vehicle according to claim 1, wherein the determining a minimum ambient temperature according to the minimum predicted ambient temperature and a current ambient temperature comprises:

determining a magnitude relationship between the minimum predicted ambient temperature and the current ambient temperature; and if the minimum predicted ambient temperature is less than the current ambient temperature, determining the minimum predicted ambient temperature as the minimum ambient temperature; or if the minimum predicted ambient temperature is greater than or equal to the current ambient temperature, determining the current ambient temperature as the minimum ambient temperature.

13. The power conservation control method for a vehicle according to claim 11, wherein the determining a minimum ambient temperature according to the minimum predicted ambient temperature and a current ambient temperature comprises:

determining a magnitude relationship between the minimum predicted ambient temperature and the current ambient temperature; and if the minimum predicted ambient temperature is less than the current ambient temperature, determining the minimum predicted ambient temperature as the minimum ambient temperature; or if the minimum predicted ambient temperature is greater than or equal to the current ambient temperature, determining the current ambient temperature as the minimum ambient temperature.

14. The power conservation control method for a vehicle according to claim 1, wherein the method further comprises:

if the minimum ambient temperature is greater than the first preset temperature threshold, determining a magnitude relationship between the minimum ambient temperature and a second preset temperature threshold; and if the minimum ambient temperature is greater than or equal to the second preset temperature threshold, controlling the vehicle to exit the mandatory power conservation control; or if the minimum ambient temperature is less than the second preset temperature threshold, maintaining a previous mandatory power conservation control state.

15. The power conservation control method for a vehicle according to claim 13, wherein the method further comprises:

if the minimum ambient temperature is greater than the first preset temperature threshold, determining a magnitude relationship between the minimum ambient temperature and a second preset temperature threshold; and if the minimum ambient temperature is greater than or equal to the second preset temperature threshold, controlling the vehicle to exit the mandatory power conservation control; or if the minimum ambient temperature is less than the second preset temperature threshold, maintaining a previous mandatory power conservation control state.

16. A power conservation control apparatus for a vehicle, comprising a non-transitory memory, a processor, and a computer program stored in the non-transitory memory and executable on the processor, wherein when the processor executes the computer program, the power conservation control method for a vehicle according to claim 1 is implemented.

17. A non-transitory computer-readable storage medium, storing a computer program, wherein the computer program, when executed by a processor, implements the power conservation control method for a vehicle according to claim 1.

\* \* \* \* \*